United States Patent [19]

Bruce

[11] Patent Number: 4,845,499
[45] Date of Patent: Jul. 4, 1989

[54] METHOD FOR GENERATING PCM LOGARITHMIC VALUES FROM LINEAR VALUES

[75] Inventor: Donovan A. Bruce, Glendale, Ariz.

[73] Assignee: AG Communication Systems Corporation, Phoenix, Ariz.

[21] Appl. No.: 116,183

[22] Filed: Nov. 2, 1987

[51] Int. Cl.$^4$ ............................................. H03M 5/02
[52] U.S. Cl. ...................................... 341/143; 375/25; 370/62
[58] Field of Search .................. 340/347 DD; 370/62, 370/63, 110.3, 118; 375/48, 89, 25, 26, 27; 381/32; 364/724; 341/53, 76, 143

[56] References Cited

U.S. PATENT DOCUMENTS

| | | | |
|---|---|---|---|
| 4,005,274 | 1/1977 | Vagliani et al. | 381/32 |
| 4,355,405 | 10/1982 | Ruys et al. | 375/89 |
| 4,466,092 | 8/1984 | Renner | 370/62 |
| 4,466,093 | 8/1984 | Renner | 370/62 |
| 4,466,094 | 8/1984 | Renner | 370/62 |
| 4,607,362 | 8/1986 | Vary et al. | 370/62 |

Primary Examiner—William M. Shoop, Jr.
Assistant Examiner—Brian Young
Attorney, Agent, or Firm—Anthony Miologos

[57] ABSTRACT

A method for generating PCM logarithmic values from linear values and storing these values in memory for efficient and rapid data retrieval is shown. This is an off-line method of generating the contents of a programmable read only memory for rapid on-line conversions from linear to logarithmic PCM values by an ISDN system. This method generates either negative or positive PCM values. An initial value and memory address are determined. Next, memory address is incremented and is PCM value decremented. The resulting PCM value is stored at successive locations throughout the memory. Each PCM value comprises a step of a segment. These operations are iterated for each of the segments required for conversion for both positive and negative PCM values.

15 Claims, 2 Drawing Sheets

METHOD FOR GENERATING PCM LOGARITHMIC VALUES FROM LINEAR VALUES

CROSS-REFERENCE TO RELATED APPLICATIONS

This Application is related to co-pending U.S. patent applications Ser. Nos. 116,180 and 116,181, which have the same assignee as the present Application. This application is also related to co-pending U.S. patent application Ser. No. 116,182, having the same inventive entity and being assigned to the same Assignee as the present Application.

BACKGROUND OF THE INVENTION

The present invention generally pertains to a conference calling arrangement for an integrated services digital network and more particularly to improvements for speaker selection and broadcasting for multi-port conference circuitry.

U.S. Pat. No. 4,466,093 teaches a time shared conference arrangement. U.S. Pat. Nos. 4,466,092 and 4,466,094 also teach similar techniques. The assignee of the present application is the successor in all rights, title and interest to the assignee of the U.S. Pat. No. 4,466,093 patent.

This patent teaches the broadcasting of the "loudest speaker" to the other conferees. A series of on-line comparisons is made between the PCM magnitude levels of up to three conferees. Such on-line comparisons require an amount of switching system real time. Next, this patent teaches the comparison of the loudest detected speaker to a threshold level. If the PCM magnitude of the speakers' values exceeds this threshold, then this loudest speaker's PCM sample is broadcast to the other conferees during the appropriate time slots. If the PCM magnitude of the loudest conferee did not exceed the threshold, then the identity of the loudest conferee stored during the previous sampling time period was selected and the corresponding PCM sample broadcast to the other conferees during the appropriate time slots.

This technique provided for rapid switching between the speakers introducing noise. As a result, the overall audible quality broadcast to the conferees is substantially degraded when two or more parties speak simultaneously.

When multiple sound sources are present, the human ear hears a combination of all the various sources. Some of the sources are louder in amplitude than others. The PCM samples, which represent speech sound, of modern digital networks are not directly combinable. Therefore, the human ear listening via a digital switching system does not hear a true combination of each conferee's speech.

PCM data samples are nonlinear logarithmic representations of human speech. Since these PCM samples are nonlinear, they are difficult to combine.

It is an object of the present invention to provide a method for efficiently generating PCM logarithmic values from linear values for rapid retrieval by a PCM speaker control circuit for a time shared conference arrangement of an integrated services digital network (ISDN).

SUMMARY OF THE INVENTION

In accomplishing the object of the present invention a novel method for generating PCM logarithmic values for a time shared ISDN conference arrangement is provided.

A method for generating PCM logarithmic values from corresponding linear values includes the following steps. Each of the generated values is stored in a particular memory location, so that, the stored logarithmic values are output when a corresponding linear value is input as an address to the memory. First, a predefined PCM logarithmic value is stored in a first memory location. The PCM logarithmic values are generated and stored as a function of an index value. Next, the index value is incremented. Then the PCM logarithmic value is decremented. The decremented PCM logarithmic value is sequentially stored in a memory location addressed by the incremented index value. Lastly, the incrementing, decrementing and storing operations are iterated until each PCM logarithmic value of a first segment of values has been stored in the memory.

Again, the index value is incremented. The PCM logarithmic value is then decremented. The decremented PCM logarithmic value is stored in a memory location address by the incremented index value. The operations of incrementing, decrementing and storing the PCM logarithmic values are iterated until each of the values of another-segment are sequentially stored in the memory. The procedure of incrementing the index value; decrementing the PCM logarithmic value; and, storing the PCM value for all the values of a segment are iterated until each of a predetermined number of segments have been completed.

DESCRIPTION OF THE PREFERRED EMBODIMENT

Figure 1:
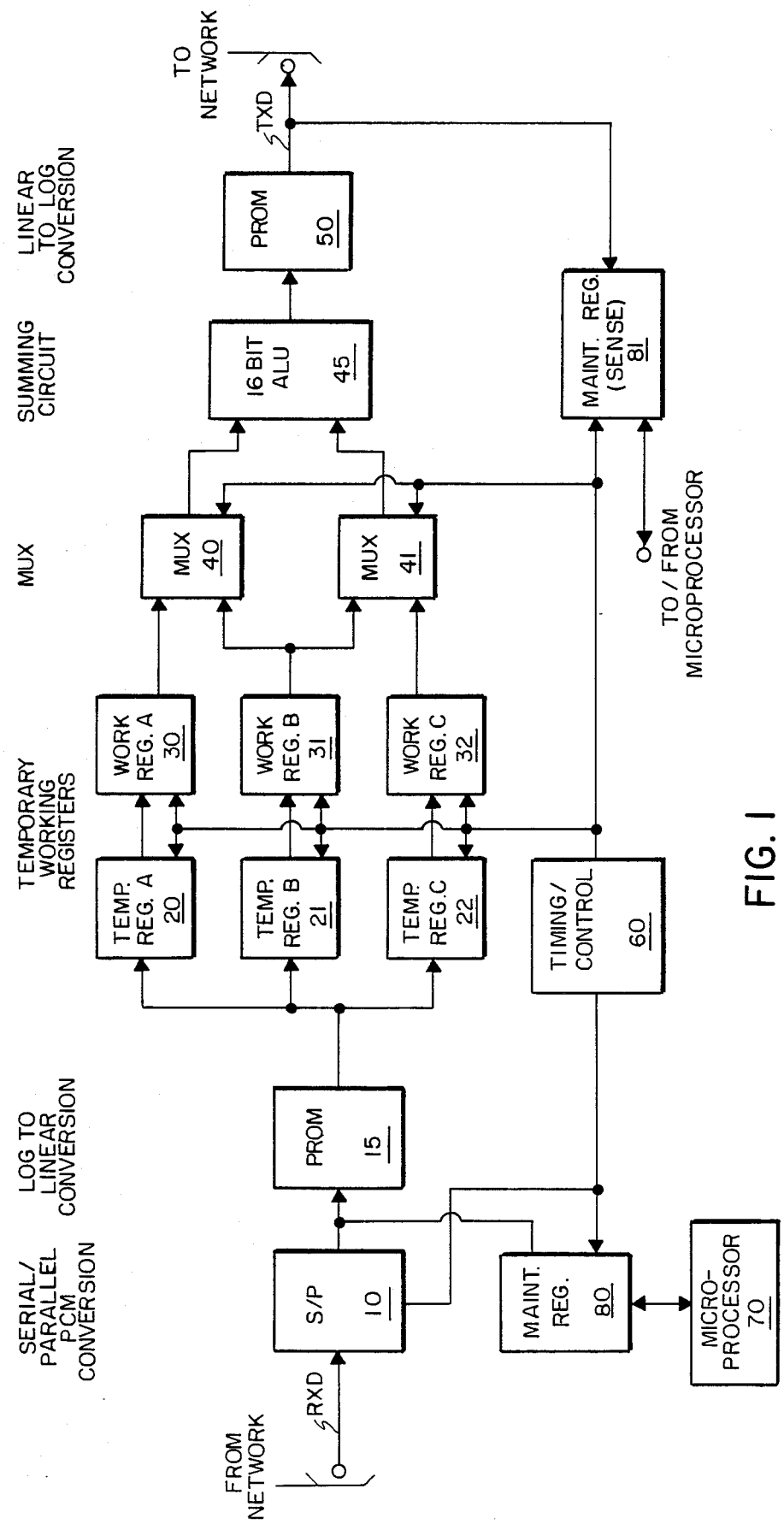
FIG. 1 is a block diagram of the conference circuit embodying the principles of operation of the present invention.

In FIG. 1, a conference circuit block diagram of an integrated services digital network (ISDN) is shown. ISDN systems typically provide for switching both data and voice communications. The conference circuit shown herein is applied only to PCM voice samples. That is, the circuit is used only for conferences between voice subscribers. In this application, only PCM voice samples are received from the ISDN system's time switched network. PCM voice data is input to the conference circuit via the received data lead RXD.

The ISDN systems transmits multiplexed voice and data at a rate of 3.088 megabytes per second. The RXD lead is connected to other logic (not shown) of the network that segregates the voice channels from the data channels. This system logic also orients the PCM voice samples of each group of three conferees, which comprise the conference call, in three adjacent channels or time slots. There are a maximum of 24 channels of information in a frame and hence a maximum of eight three party conference groups.

Figure 2:
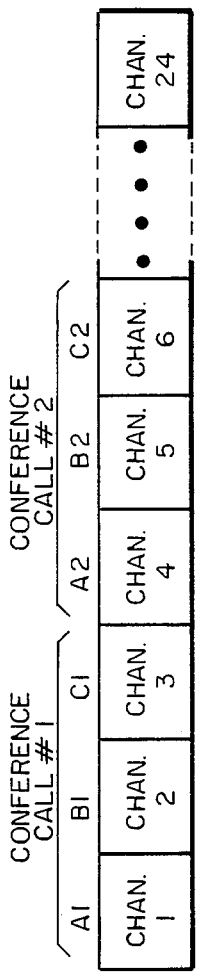
FIG. 2 is a layout of the channel input to and output from the conference circuit via the network.

FIG. 2 shows that callers A1, B1 and C1, with their PCM voice samples in channels 1, 2 and 3 respectively, comprise conference call 1. Similarly, speakers A2, B2 and C2 with their PCM voice samples in channels 4, 5 and 6 respectively, comprise conference call 2. Up to eight time shared conference calls may be handled by this conference circuit arrangement.

The input bit stream is serially transmitted from the network via the RXD lead to serial to parallel shift register 10. Whenever a complete PCM voice sample has been collected by serial to parallel shift register 10, the resulting parallel word is transmitted to programmable read only memory (PROM) 15 as an address. PROM 15 has been preprogrammed with values which convert the logarithmic PCM voice samples to a corresponding linear form. PROM 15 is 256×16-bits and may be implemented with two 256×8-bit programmable read only memory devices.

Timing and control circuit 60 provides for controlling the transfer of each parallel word from shift register 10 to PROM 15. Each address input to PROM 15, causes PROM 15 to output the data located at the corresponding address. This data is output to the temporary registers A, B and C, 20, 21 and 22, respectively. Timing and control circuit 60 allows the output of PROM 15 to be latched up by temporary register 20, 21, or 22. The contents of the temporary registers 20, 21 and 22 represent the linear forms of the PCM voice samples of the three conference callers of conference call 1. In other words, the linear representations of the information contained in channels 1, 2 and 3 of now reside in temporary registers 20, 21 and 22, respectively.

After all three samples have been converted and are stored in temporary registers 20, 21 and 22, timing and control circuit 60 causes the contents of the temporary registers 20, 21 and 22 to be transferred to working registers 30, 31 and 32, respectively. The purpose of this transfer is to allow the temporary registers to be filled with the converted data for the next conference call sharing this circuit, conference call 2. This occurs simultaneously with the processing of the samples of conference call 1 contained in the working registers.

During the next three time slots the temporary registers 20, 21 and 22 are collecting converted linear samples of channels A2, B2 and C2 of conference call 2. During these same time slots, working registers 30, 31 and 32 are transmitting their values through multiplexers 40 and 41 under the control of timing and control circuit 60.

First, the converted samples contained in working register B 31 and working register C 32 are transmitted through multiplexers 40 and 41, respectively. The two linear values of working registers 30 and 31 are then added by 16-bit ALU 45. 16-BIT ALU 45 is an arithmetic logic unit. This arithmetic logic unit may be implemented with a Texas Instruments integrated circuit part number HC382 or suitable equivalent such as those manufactured by National Semiconductor or other manufacturers. The arithmetic logic unit 45 directly adds the two linear samples. Any resulting value which exceeds the maximum value is truncated.

The output of arithmetic logic unit 45 is transmitted as an address to PROM 50. PROM 50 is a programmable read only memory and may be implemented with a 16K×8-bit electronically programmable read only memory device. PROM 50 has been preprogrammed with values which convert the linear values, applied as addresses to the PROM, into logarithmic PCM voice sample values. The values output by PROM 50 are transmitted via the TXD lead back to the ISDN network. This value is transmitted to speaker A1. This value represents the combined PCM values of speakers B1 and C1.

Next, conferee B1 receives the combined values of conferees A1 and C1. In accomplishing this, timing of control circuit 60 gates the contents of working registers 30 and 32 through multiplexers 40 and 41, respectively. These two values are added by ALU 45. The output of ALU 45 is transmitted as an address to PROM 50 which converts the combined linear representation to the corresponding logarithmic representation. PROM 50 transmits, via the TXD lead, the combined PCM voice sample during the appropriate time slot of conference caller B1. The sample is transmitted to the ISDN network.

Lastly, for conference call 1, conference caller C1 receives the combination of the PCM voice samples of callers A1 and B1. During the next time slot, timing and control circuit gates the contents of working register 30, the converted sample of conferee A1, through multiplexer 40 and gates the contents of working register 31, the converted sample of conferee B1, through multiplexer 41 to ALU 45. ALU 45 combines these linear representations. Next, ALU 45 transmits the result to PROM 50 as an address. This address causes the contents of that location to be read from PROM 50; and, as a result, the linear representation is converted to the corresponding PCM logarithmic representation. PROM 50 then transmits this value via the TXD lead to the ISDN network. In this way, conferee C1 receives the additive combination of the voice samples of speakers A1 and B1.

The voice samples from conference call 2 have now been converted from logarithmic representation to linear representation and stored in temporary registers 20, 21 and 22. During the next three successive time slots, the samples conference call 2 are processed as described above for conference call 1.

A maintenance feature for determining the integrity of the circuit is also provided. Microprocessor 70 is connected to maintenance register 80. Microprocessor 70 transmits test voice samples to maintenance register 80. Maintenance register 80 is connected to PROM 15. Under the control of timing and control circuit 60, serial to parallel shift register 10 may be inhibited from transmitting a voice sample to PROM 15. Instead, timing and control circuit 60 allows maintenance register 80 to transmit the test sample to PROM 15. In this manner, a number of test PCM voice samples may be transmitted to the conference circuit and a test conference call is generated as a result. The conference circuit will process these test voice samples as though they were actual speakers' voice samples.

When these test samples have been processed by the conference circuit and are output via the TXD lead, microprocessor 70 informs maintenance register sense 81. Maintenance register sense 81 then removes each of the test PCM samples before transmission to the ISDN network and transmits them to microprocessor 70. Microprocessor 70 then compares the test samples obtained from PROM 50 with the known combinations of the original test samples transmitted to maintenance register 80. If the samples compare, the circuit is operating properly. Miscomparisons indicate circuit failures or faults.

PROM 15 of FIG. 1 performs the conversion from the PCM logarithmic values to linear values. The contents of PROM 15 are calculated in accordance with the CCITT U-law charts as contained in the CCITT Recommendations G.711. Values for each of the locations of PROM 15 may be calculated using the following formula:

$$Y_n = \frac{X_n + X_{n+1}}{2} \text{ for } 1 < n < 127$$

where $y_0 = x_0 = 0$, for $n = 0$.

Each value of $Y_0$ calculated by the above formula is stored in 256×16-bit PROM 15. The linear values of $Y_n$ are stored at addresses which correspond to the equivalent values of the logarithmic PCM sample values. As a result, when PROM 15 is addressed by the PCM value in logarithmic form, the equivalent linear value is output by PROM 15 on its 16-bit databus.

PROM 50 converts linear values to logarithmic PCM value in accordance with CCITT Recommendations G.711. Linear values are transmitted to PROM 50 as an input address. Within PROM 50, positive and negative sample values are represented by + or −8159 linear decision levels. As outlined in the above mentioned CCITT Recommendations, each decision level maps into a portion of a step within a segment. There eight different segments for both positive and negative input linear samples. Each step portion of the address input to PROM 50 has a corresponding logarithmic PCM value stored at that location. There are sixteen PCM values or steps in each segment.

Figures 3A, 3B:
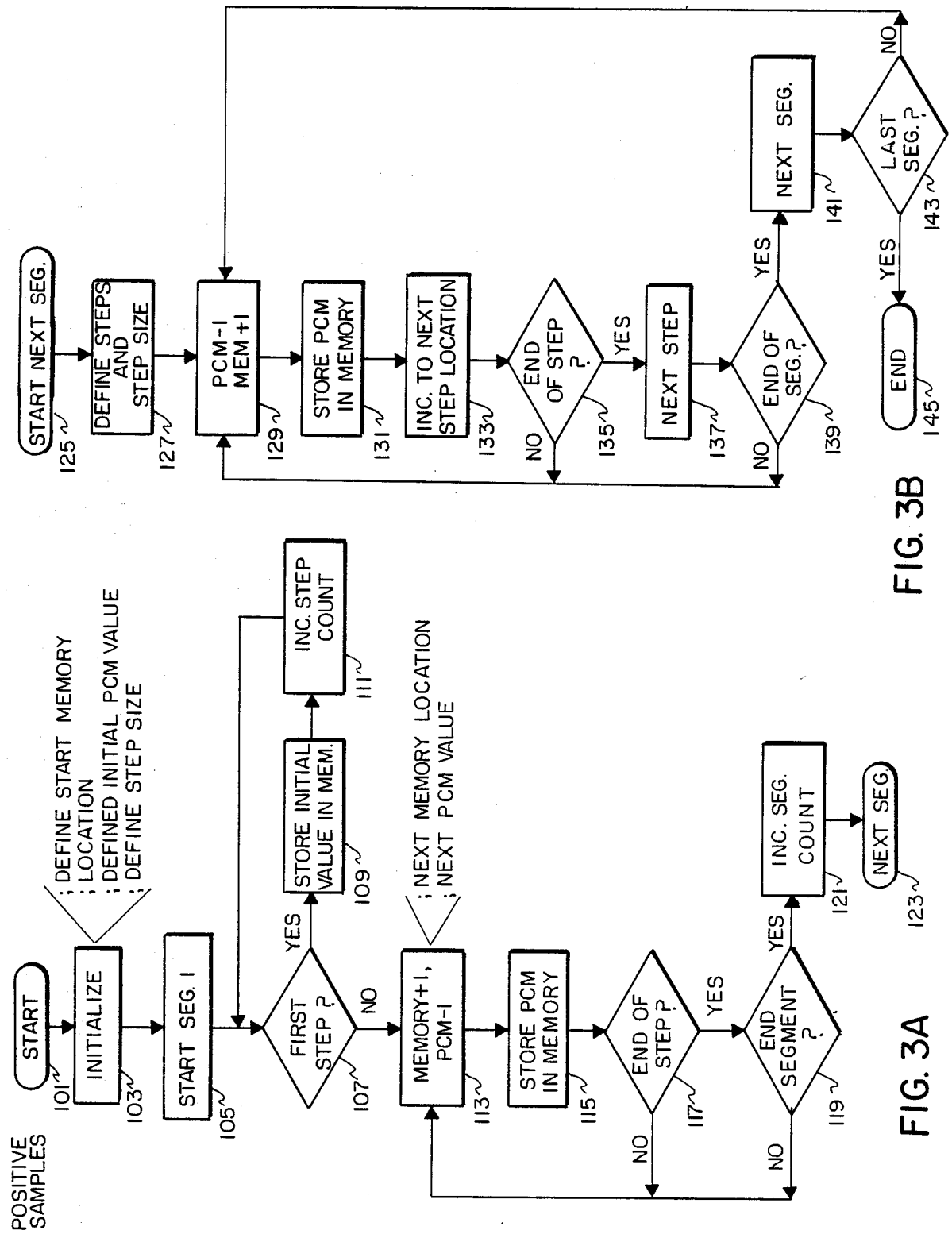
FIGS. 3A and 3B are a flow chart of a method for converting linear values to PCM logarithmic values.

Generation of the contents of PROM 50 is accomplished as shown by FIGS. 3A and 3B. The procedure is shown for positive PCM values, but is identical for producing negative PCM sample values. The procedure for generating the contents of PROM 50 is started at block 101. Next, an initialization step is performed, block 103. The memory start location is defined. This is location zero hexadecimal for the negative values and location 2000 hexadecimal for the positive values. The initial PCM value is also defined as 7F hexadecimal for the negative values and FF for the positive values. The step size is also defined.

The segment count is started at a value of 1, block 105. Next, it is determined whether this is the first step, block 107. Since this is the first step, block 109 stores the initial value in memory. The step count is incremented by one, block 111. Then control is returned to block 107.

Block 107 again determines whether this was the first step. Since this is not the first step, block 107 transfers control via the NO path to block 113. Block 113 increments the memory location by one and decrements the PCM value by one. The calculated PCM value is stored in the memory at the memory location which was calculated, block 115.

Next, it is determined whether this is the end of a step, block 117. If the answer is negative, block 117 transfers control via the NO path to block 113. The steps of blocks 113 and 115 are iterated until the end of the step is detected by block 117. When the step is ended, block 117 transfers control to block 119 via the YES path. If this is not the end of a segment, block 119 transfers control to block 113 via the NO path. Again, the steps of blocks 113, 115 and 117 are iterated until the end of this segment is detected by block 119.

When the end of the segment is detected, block 119 transfers control to block 121 via the YES path. Block 121 increments the segment count by one. Block 123 is entered from block 121. Block 123 transfers control to block 125 which begins the calculations for the next segment.

Block 125 transfers control to block 127 which defines the steps and step size. Next, block 129 decrements the PCM value by one and increments the memory address location by one. The calculated PCM value is stored in the new memory address location, block 131. The step is incremented to the next step location, block 133. Block 135 determines whether the end of the step is reached. If the answer is negative, block 135 transfers control to block 129 via the NO path. As a result, blocks 129, 131 and 133 are iterated.

When the end of a step is determined, block 135 transfers control via the YES path to block 137. Block 137 increments the step to the next step value. Then, block 139 determines whether the end of the segment has been detected. If not, block 139 transfers control to block 129 via the NO path. Blocks 129 through 137 are then iterated, until it is determined that the end of the segment is detected.

When the end of the segment has been determined, block 139 transfers control to block 141 via the YES path. Block 141 increments the segment value. Lastly, block 143 determines whether this is the last segment. If this is not the last segment, block 143 transfers control to block 129 via the NO path. As a result, the steps of blocks 129 through 141 are iterated until the last segment is detected. When the last segment is detected block 143 transfers control to block 145 and the procedure is ended.

Table 1 shows a position of the negative values contained by PROM 50. All values are given in hexadecimal.

TABLE 1

| ADDRESS | CONTENTS |
| --- | --- |
| 0000 | 7F |
| 0001 | 7E |
| 0002 | 7E |
| 0003 | 7D |
| 0004 | 7D |
| 0005 | 7C |
| 0006 | 7C |
| 0007 | 7B |
| 0008 | 7B |
| . | . |
| . | . |
| . | . |

Table 2 shows a portion of the positive values contained by PROM 50. All values are given in hexadecimal.

TABLE 2

| ADDRESS | CONTENTS |
| --- | --- |
| 2000 | FF |
| 2001 | FE |
| 2002 | FE |
| 2003 | FD |
| 2004 | FD |
| 2005 | FC |
| 2006 | FC |
| 2007 | FB |
| 2008 | FB |
| . | . |
| . | . |
| . | . |

Although the preferred embodiment of the invention has been illustrated, and that form described in detail, it will be readily apparent to those skilled in the art that various modifications may be made therein without departing from the spirit of the invention or from the scope of the appended claims.

What is claimed:

1. A method for generating the PCM logarithmic values from corresponding linear values said generated values being stored in a memory, said method for generating comprising the steps of:

first storing a predefined PCM logarithmic value in a memory location addressed by a first index value;
first incrementing said first index value;
first decrementing said predefined PCM logarithmic value;
second storing said decremented PCM logarithmic value in a memory location addressed by said incremented first index value;
first iterating said steps of first incrementing, first decrementing and second storing for sequentially storing each said PCM logarithmic value of a segment;
second incrementing said first index value;
second decrementing said PCM logarithmic value;
third storing said decremented PCM logarithmic value in a memory location addressed by said incremented first index value;
second iterating said steps of second incrementing, second decrementing and third storing for sequentially storing each said PCM logarithmic value of a segment; and
third iterating said steps of second incrementing, second decrementing, third storing and second iterating for predetermined number of segments.

2. A method for generating as claimed in claim 1, wherein there is further included the step of first initializing said first index value equal to an initial memory address location.

3. A method for generating as claimed in claim 2, said initial memory address location being equal to zero for negative PCM logarithmic values.

4. A method for generating as claimed in claim 3, said initial memory address location being equal to 2000 hexadecimal for positive PCM logarithmic values.

5. A method for generating as claimed in claim 4, wherein there is further included the step of second initializing said predefined PCM logarithmic value equal to 7F hexadecimal for said negative values.

6. A method for generating as claimed in claim 5, wherein there is further included the step of third initializing said predefined PCM logarithmic value equal to a value of FF hexadecimal for said positive values.

7. A method for generating as claimed in claim 6, wherein there is further included the step of first setting a number of PCM logarithmic values in a segment equal to 16.

8. A method for generating as claimed in claim 7, wherein there is further included the step of third initializing a step value equal to one.

9. A method for generating as claimed in claim 8, said step of first storing including the steps of:

first determining whether said step value is equal to one; and
third incrementing said step value for said step value being equal to one.

10. A method for generating as claimed in claim 9, said step of first iterating including the steps of:

second determining whether said step value has achieved a maximum count;
third determining whether all PCM logarithmic values of said first segment have been calculated; and
fourth incrementing a segment count by one for said completion of said first segment.

11. A method for generating as claimed in claim 10, said step of third storing including the step of fifth incrementing said step value.

12. A method for generating as claimed in claim 11, said step of second iterating including the steps of:

fourth determining whether said step value has achieved said maximum count; and
fifth determining whether all the PCM logarithmic values of a segment have been calculated.

13. A method for generating as claimed in claim 12, said step of third iterating including the steps of:

sixth incrementing said segment count; and
sixth determining whether said segment count has achieved a maximum count.

14. A method for generating as claimed in claim 13, said maximum count of said step value being equal to 16.

15. A method for generating as claimed in claim 14, said maximum count of said segment count being equal to 8.

* * * * *